US006957210B1

(12) United States Patent
Ramesh

(10) Patent No.: US 6,957,210 B1
(45) Date of Patent: Oct. 18, 2005

(54) OPTIMIZING AN EXCLUSION JOIN OPERATION USING A BITMAP INDEX STRUCTURE

(75) Inventor: Bhashyam Ramesh, San Diego, CA (US)

(73) Assignee: NCR Corporation, Dayton, OH (US)

( * ) Notice: Subject to any disclaimer, the term of this patent is extended or adjusted under 35 U.S.C. 154(b) by 430 days.

(21) Appl. No.: 10/038,783

(22) Filed: Dec. 31, 2001

(51) Int. Cl.$^7$ .............................................. G06F 17/30
(52) U.S. Cl. ........................................ 707/2; 707/100
(58) Field of Search ................................ 707/1, 2, 100

(56) References Cited

U.S. PATENT DOCUMENTS

| | | | |
|---|---|---|---|
| 5,426,760 A | | 6/1995 | Moreland |
| 5,706,495 A | | 1/1998 | Chadha et al. |
| 5,781,896 A | | 7/1998 | Dalal |
| 5,787,435 A | | 7/1998 | Burrows |
| 5,802,521 A | | 9/1998 | Ziauddin et al. |
| 5,873,074 A | * | 2/1999 | Kashyap et al. ............... 707/2 |
| 5,905,985 A | | 5/1999 | Malloy et al. |
| 5,937,408 A | | 8/1999 | Shoup et al. |
| 5,953,723 A | | 9/1999 | Linoff et al. |
| 5,960,428 A | | 9/1999 | Lindsay et al. |
| 5,960,434 A | | 9/1999 | Schimmel |
| 5,963,933 A | | 10/1999 | Cheng et al. |
| 5,963,954 A | | 10/1999 | Burrows |
| 6,049,804 A | | 4/2000 | Burgess et al. |
| 6,088,691 A | | 7/2000 | Bhargava et al. |
| 6,105,020 A | * | 8/2000 | Lindsay et al. ................ 707/2 |
| 6,397,204 B1 | * | 5/2002 | Liu et al. ....................... 707/2 |
| 6,446,063 B1 | * | 9/2002 | Chen et al. ..................... 707/4 |
| 6,484,159 B1 | * | 11/2002 | Mumick et al. ............... 707/2 |
| 6,606,638 B1 | | 8/2003 | Tarin |
| 6,618,729 B1 | * | 9/2003 | Bhashyam et al. ......... 707/101 |
| 6,684,203 B1 | * | 1/2004 | Waddington et al. .......... 707/3 |

OTHER PUBLICATIONS

Shum, Parallel Implementations of Exclusion Joins, Proceedings of the Fifth IEEE Symp. on Parallel and Distributed Processings, Dec. 1–4, 1993, pp. 742–747.*
Toyama et al., Hash–Based Symmetric Data Structure and Join Algorithm for OLAP Applications, IEEE International Symposium Proceedings on Database Engineering and Applications, Aug. 2–4, 1999, pp. 231–238.*
Johnson, Relational Database Structure: Links, Joins and Normalization, <http://acl.arts.usyd.edu.au/VISTA/14–relational_databases/detailed_example.htm> pp. 1–5, Sep. 29, 1999.*
Bontempo et al. , Accelerating Indexed Searching, copywright 1997 Miller Freeman Inc., www.dbpd.com/vault/bontempo.htm.

* cited by examiner

*Primary Examiner*—Greta Robinson
(74) *Attorney, Agent, or Firm*—Baker Botts LLP

(57) ABSTRACT

A method, computer program and database system are disclosed for performing an exclusion join of at least a first table T1 and a second table T2, where each of the tables has an associated Star Map, S1 and S2, respectively. Each Star Map includes bitmap entries having locations indexed by the hash of one or more values associated with one or more join key columns of its associated table. The method, computer program, and database system include a) performing one or more Boolean operations using the bitmap entries of the Star Maps S1 and S2 to produce bitmap entries in a Star Map SJ where there is a corresponding set bitmap entry in S1 and no corresponding set bitmap entry in S2; b) using SJ to identify qualifying rows from the first table T1; and c) providing the qualifying rows as an exclusion join result.

42 Claims, 8 Drawing Sheets

OPTIMIZING AN EXCLUSION JOIN OPERATION USING A BITMAP INDEX STRUCTURE

BACKGROUND

Relational DataBase Management Systems (RDBMS) using a Structured Query Language (SQL) interface are well known in the art. The SQL interface has evolved into a standard language for RDBMS software and has been adopted as such by both the American National Standards Institute (ANSI) and the International Standards Organization (ISO). In an RDBMS, all data is externally structured into tables. A table in a relational database is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies in its ability to link information from multiple tables or views together to perform complex sets of procedures with a single statement.

The SQL interface allows users to formulate relational operations on the tables. One of the most common SQL queries executed by the RDBMS is the SELECT statement. In the SQL standard, the SELECT statement generally comprises the format: "SELECT <clause> FROM <clause> WHERE clause> GROUP BY<clause> HAVING <clause> ORDER BY<clause>." The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

A join operation is usually implied by naming more than one table in the FROM clause of a SELECT statement. A join operation makes it possible to combine tables by combining rows from one table with another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

An exclusion join operation selects rows in a first table having values in specified columns where the values cannot be found in a specified column of a second table. A database system may execute such a query by excluding entries in the first table that match entries in the <second table.

SUMMARY

In general, in one aspect, the invention features a method for performing an exclusion join of at least a first table T1 and a second table T2, where each of the tables has an associated Star Map, S1 and S2, respectively. Each Star Map includes bitmap entries having locations indexed by the hash of one or more values associated with one or more join key columns of its associated table. A bitmap entry in a Star Map, if set, indicates the presence of one or more rows in its associated table that has entries in the one or more join key columns that together hash to the location of the bitmap entry. The method includes a) performing one or more Boolean operations using the bitmap entries of the Star Maps S1 and S2 to produce bitmap entries in a Star Map SJ where there is a corresponding set bitmap entry in S1 and no corresponding set bitmap entry in S2; b) using SJ to identify qualifying rows from the first table T1; and c) providing the qualifying rows as an exclusion join result.

Implementations of the invention may include one or more of the following. Using SJ to identify qualifying rows from the first table T1 may include performing the following until all rows from T1 have been selected: b1) selecting a row in T1, b2) hashing the combined entries in the one or more join key columns of the selected row to identify a bitmap entry in SJ, and b3) if the identified bitmap entry in SJ is set, identifying the selected row as a qualifying row. The exclusion join may include join conditions. Using SJ to identify qualifying rows from the first table T1 may further include b4) if the identified bitmap entry in SJ is not set, attempting to find a row in T2 that has entries in its one or more join key columns that together hash to the location of the identified unset bitmap entry in SJ, and b5) if no such row can be found or if no found row from T2 satisfies the join conditions, identifying the selected row from T1 as a qualifying row. The method may only perform b and c if the number of unset bitmap entries in SJ is less than a threshold. The threshold may be related to the number of rows in T2 and a number of blocks used to store T2. The method may include determining an expected join cardinality and only performing a, b and c if the expected join cardinality is less than a cardinality threshold.

One of the one or more Boolean operations may produce an intermediate Star Map S1. The intermediate Star Map SINT may result from ANDing Star Maps S1 and S2 and Star Map SJ may result from exclusive ORing Star Map SINT and S1. The intermediate Star Map SINT may result from ORing Star Maps S1 and S2 and Star Map SJ may result from exclusive ORing Star Map SINT and S2. The intermediate Star Map SINT may result from inverting Star Map S2 and Star Map SJ may result from ANDing Star Maps SINT and S1. A plurality of tables T1' and tables T2' and a plurality of associated Star Maps S1' and Star Maps S2' may be provided. Star Maps S1' may be logically ORed to generate Star Map S1 and Star Maps S2' may be logically ORed to generate Star Map S2.

In general, in another aspect, the invention features a computer program, stored on a tangible storage medium, for performing an exclusion join of at least a first table T1 and a second table T2, where each of the tables has an associated Star Map, S1 and S2, respectively. Each Star Map includes bitmap entries having locations indexed by the hash of one or more of values associated with one or more join key columns of its associated table. A bitmap entry in a Star Map, if set, indicates the presence of one or more rows in its associated table that has entries in the one or more join key columns that together hash to the location of the bitmap entry. The program includes executable instructions that cause a computer to a) perform one or more Boolean operations using the bitmap entries of the Star Maps S1 and S2 to produce bitmap entries in a Star Map SJ where there is a corresponding set bitmap entry in S1 and no corresponding set bitmap entry in S2, b) use SJ to identify qualifying rows from the first table T1, and c) provide the qualifying rows as an exclusion join result.

In general, in another aspect, the invention features a database system for accessing a database. The database system includes a massively parallel processing system including one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities. At least a first table T1 and a second table T2 are distributed among the data-storage facilities. Each of the tables has an associated Star Map, S1 and S2, respectively, each Star Map being distributed among the data-storage facilities. Each Star Map includes bitmap entries having locations indexed by the hash of one or more of values associated with one or more join key columns of its associated table. A bitmap entry in a Star Map, if set, indicates the presence of one or more rows in its associated table that has entries in the one or more join key columns that together hash to the location of the bitmap entry. A join process executed on one or more of the plurality of CPUs causes the CPUs to a) perform one or more Boolean operations using the bitmap entries of the Star Maps S1 and S2 to produce bitmap entries in a Star Map SJ where there is a corresponding set bitmap entry in S1 and no corresponding set bitmap entry in S2, b) use SJ to identify qualifying rows from the first table T1, and c) provide the qualifying rows as an exclusion join result.

Implementations of the invention may include one or more of the following. One or more of the Star Maps may be a table and a first portion of the hash value that indexes the locations of a Star Map may define a row within the Star Map and a second portion of the hash value may define an offset within the defined row. The first portion may be the first half of the hash value and the second portion may be the second half of the hash value. The hash value may be 32 bits long, the first portion may be the first 16 bits of the hash value, and the second portion may be the second 16 bits of the hash value. Each entry in a Star Map may be one bit. Each entry in a Star Map may be sixteen bits. Each Star Map entry may include one or more bits and each bit may correspond to the hash of one or more values associated with the one or more join key columns of its associated table.

In general, in another aspect, the invention features a method for performing an exclusion join of at least a first table T1 and a second table T2. Table T2 has an associated Star Map S2 which includes bitmap entries having locations indexed by the hash of one or more values associated with one or more join key columns of T2. A bitmap entry in S2, if set, indicates the presence of one or more rows in T2 that has entries in the one or more join key columns that together hash to the location of the bitmap entry. The method includes a) selecting a row in T1, b) hashing the combined entries in the one or more join key columns of the selected row to identify a bitmap entry in S2, c) if the identified bitmap entry in S2 is not set, identifying the selected row as a qualifying row, d) if the identified bitmap entry in S2 is set, finding one or more rows in T2 that have entries in its one or more join key columns that together hash to the location of the identified set bitmap entry in S2, e) if none of the one or more found rows from T2 satisfy the join conditions, identifying the selected row from T1 as a qualifying row, f) repeating a)–e) until all of the rows in T1 have been selected, and f) providing the qualifying rows as an exclusion join result.

In general, in another aspect, the invention features a method for performing a join of at least a first table T1 and a second table T2, where each of the tables has an associated Star Map, S1 and S2, respectively. Each Star Map includes bitmap entries having locations indexed by the hash of one or more values associated with one or more join key columns of its associated table. A bitmap entry in a Star Map, if set, indicates the presence of one or more rows in its associated table that has entries in the one or more join key columns that together hash to the location of the bitmap entry. The method includes a) if the bitmap entry corresponding to the location in S1 identified by the hash of a NULL is set, probe T1 for a row having NULLs in its one or more join key columns, and if such a row is found, exiting the query with a "no rows found" message, b) otherwise if the bitmap entry corresponding to the location in S2 identified by the hash of a NULL is set, probe T2 for a row having NULLs in its one or more join key columns, and if such a row is found, exiting the query with a "no rows found" message; and c) otherwise perform the join operation.

Other features and advantages will become apparent from the description and claims that follow.

DETAILED DESCRIPTION

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Overview

The present invention uses a bitmap index structure, known as a Star Map, to improve the performance of large table exclusion joins that have low join cardinality, where cardinality is related to the number of rows in the join result. The database system uses hash-based addressing in the Star Map, so that the size of the Star Map is constant and therefore access times are constant. Moreover, access times are independent of the number of rows in the tables being joined, up to a preset limit, which can be altered by a systems administrator. As a result, the Star Map improves the performance of exclusion joins where two or more large tables are joined and the cardinality of the join is small (i.e., the join result has a small number of rows).

Environment

Figure 1:
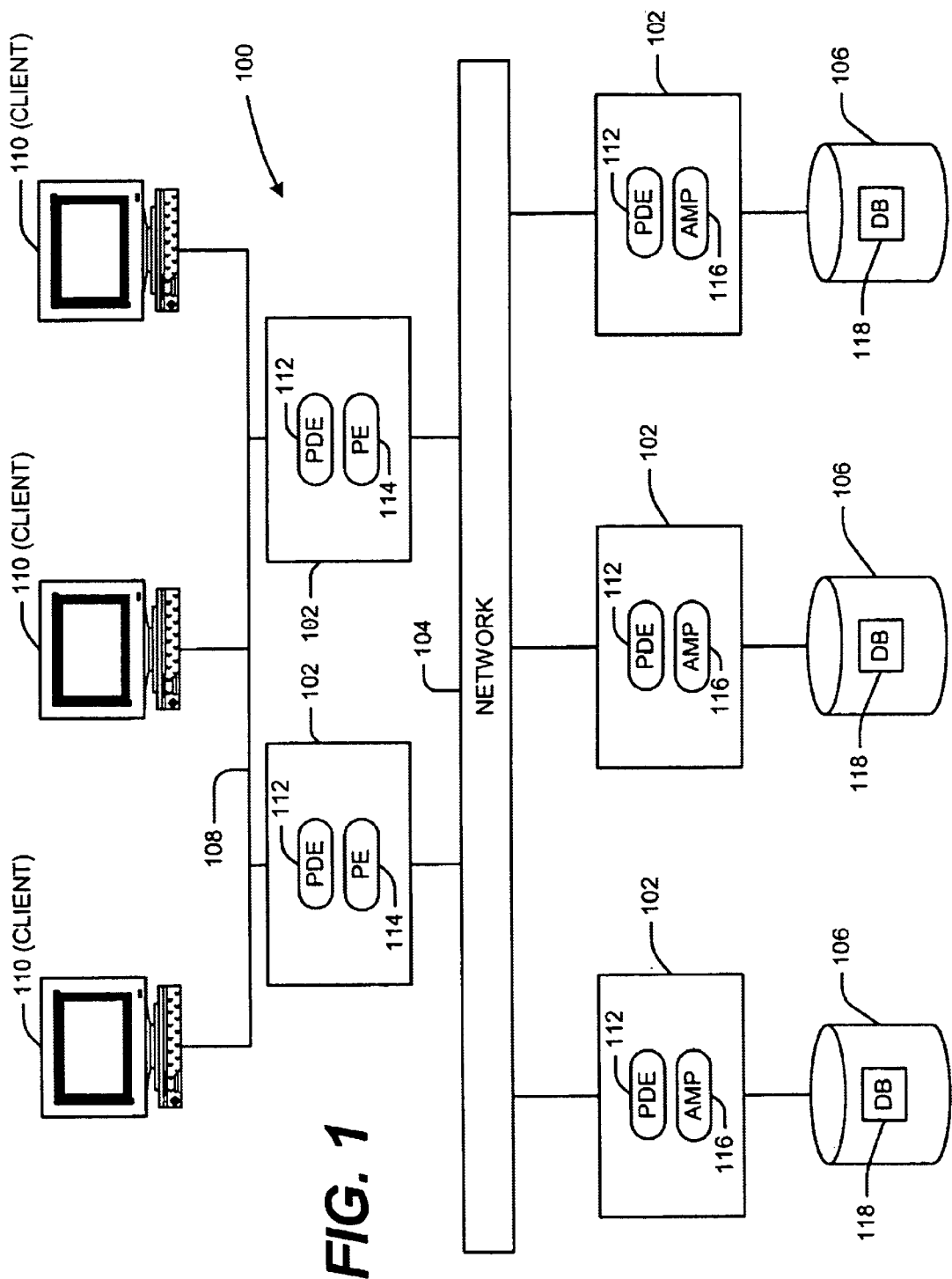
FIG. 1 illustrates an exemplary hardware and software environment that could be used with the preferred embodiment of the present invention.

FIG. 1 illustrates an exemplary hardware and software environment that could be used to implement the database system described below. In the exemplary environment, a computer system 100 is comprised of one or more processing units (PUs) $102_{1..N}$, also known as processors or nodes, which are interconnected by a network 104. Each of the PUs $102_{1..N}$ is coupled to zero or more fixed and/or removable data storage units (DSUs) $106_{1..M}$, such as disk drives, that store one or more relational databases. Further, each of the PUs $102_{1..N}$, is coupled to zero or more data communications units (DCUs) 108, such as network interfaces, that communicate with one or more remote systems or devices.

Operators of the computer system 100 typically use one of the workstations $101_{1..A}$, a terminal, a computer, or another input device to interact with the computer system 100. This interaction generally comprises queries that conform to the Structured Query Language (SQL) standard, and invoke functions performed by a Relational DataBase Management System (RDBMS) executed by the system 100.

In one example, the RDBMS comprises the Teradata® product offered by NCR Corporation, the assignee of the present invention, and includes one or more Parallel Database Extensions (PDEs) $112_{1..N}$. Parsing Engines (PEs) $114_{1..B}$, and Access Module Processors (AMPs) $116_{1..C}$. These components of the RDBMS perform the functions necessary to implement the RDBMS and SQL functions, i.e., definition, compilation, interpretation, optimization, database access control, database retrieval, and database update.

Generally, the PDEs $112_{1..N}$ PEs $114_{1..B}$, and AMPs $116_{1..C}$ are tangibly embodied in and/or accessible from a device, media, carrier, or signal, such as RAM, ROM, one or more of the DSUs 106, and/or a remote system or device communicating with the computer system 100 via one or more of the DCUs 108. The PDEs $112_{1..N}$, PEs $114_{1..B}$, and AMPs $116_{1..C}$ each comprise logic and/or data which, when executed, invoked, and/or interpreted by the PUs $102_{1..N}$ of the computer system 100, cause the necessary steps or elements described below to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

In an example system, work is divided among the PUs $102_{1..N}$ in the system 100 by spreading the storage of a partitioned relational database 118 managed by the RDBMS across multiple AMPs 116 and the DSUs $106_{1..M}$ (which are managed by the AMPs $116_{1..C}$). Thus, one of thee DSUs $106_{1..M}$ may store only a subset of rows that comprise a table in the partitioned database 1118 and work is managed by the system 100 so that the task of operating on each subset of rows is performed by the AMPs $116_{1..C}$ managing the DSUs $106_{1..M}$ that store the subset of rows.

The PDEs $112_{1..N}$ provide a high speed, low latency, message-passing layer for use in communicating between the PEs $114_{1..B}$ and AMPs $116_{1..C}$. Further, each of the PDEs $112_{1..N}$ is an application programming interface (API) that allows the RDBMS to operate under either the UNIX MP-RAS or WINDOWS NT operating systems, in that each of the PDEs $112_{1..N}$ isolates most of the operating system dependent functions from the RDBMS, and performs many operations such as shared memory management, message passing, and process or thread creation.

The PEs $114_{1..B}$ handle communications, session control, optimization and query plan generation and control, while the AMPs $116_{1..C}$ handle actual database $118_{1..M}$ table manipulation. The PEs 114 fully parallelize all functions among the AMPs $116_{1..C}$. Both the PEs $114_{1..B}$ and AMPs $116_{1..C}$ are known as "virtual processors" or "vprocs".

The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when one of the PUs $102_{1..N}$ itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a query or other unit of work into smaller sub-units, each of which can be assigned to one of the AMPs $116_{1..C}$. In one example, data partitioning and repartitioning may be performed, in order to enhance parallel processing across multiple AMPs $116_{1..C}$. For example, the database 118 may be hash partitioned, range partitioned, or not partitioned at all (i.e., locally processed).

Hash partitioning is a partitioning scheme in which a predefined hash function and map is used to assign records to AMPs $116_{1..C}$, wherein the hashing function generates a hash "bucket" number and the hash bucket numbers are mapped to AMPs $116_{1..C}$. Range partitioning is a partitioning scheme in which each of the AMPs $116_{1..C}$ manages the records falling within a range of values, wherein the entire data set is divided into as many ranges as there are AMPs $116_{1..C}$. No partitioning means that a single one of the AMP $116_{1..C}$ manages all of the records.

Execution of SQL Queries

Figure 2:
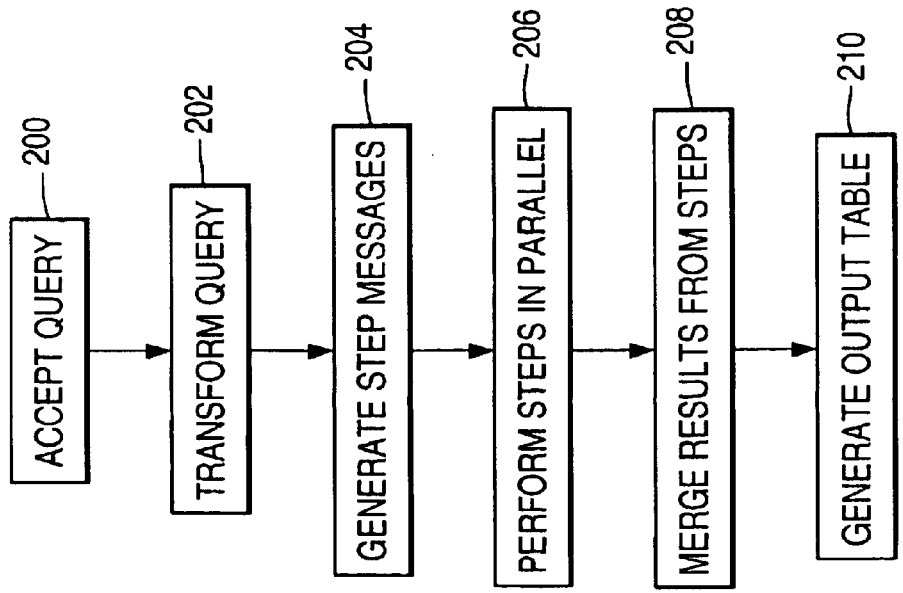
FIG. 2 is a flow chart illustrating the steps necessary for the interpretation and execution of user queries or other SQL statements according to the preferred embodiment of the present invention.

FIG. 2 is a flow chart illustrating the steps necessary for the interpretation and execution of user queries or other SQL statements according to the preferred embodiment of the present invention.

Block 200 represents SQL statements being accepted by one of the PEs $114_{1..B}$.

Block 202 represents the SQL statements being transformed by a Compiler or Interpreter subsystem of one of the PEs $114_{1..B}$ into an execution plan. Moreover, an Optimizer subsystem of one of the PEs $114_{1..B}$ may transform or optimize the execution plan in a manner described in more detail later in this specification.

Block 204 represents one of the PEs $114_{1..B}$ generating one or more "step messages" from the execution plan, wherein each step message is assigned to one of the AMPs 116 that manages the desired records. As mentioned above, the rows of the tables in the database 118 may be partitioned or otherwise distributed among multiple AMPs $116_{1..C}$, so that multiple AMPs $116_{1..C}$ can work at the same time on the data of a given table. If a request is for data in a single row, one of the PEs $114_{1..B}$ transmits the steps to one of the AMPs $116_{1..C}$ in which the data resides. If the request is for multiple rows, then the steps are forwarded to all participating AMPs $116_{1..C}$. Since the tables in the database $118_{1..M}$ may be partitioned or distributed across the DSUs $106_{1..M}$ of the AMPs $116_{1..C}$, the workload of performing the SQL query can be balanced among AMPs $116_{1..C}$ and DSUs $106_{1..M}$.

Block 204 also represents one of the PEs $114_{1..B}$ sending the step messages to their assigned AMPs $116_{1..C}$.

Block 206 represents one of the AMPs $116_{1..C}$ performing the required data manipulation associated with the step messages received from one of the PEs $114_{1..B}$, and then transmitting appropriate responses back to one of the PEs $114_{1..B}$.

Block 208 represents one of the PEs $114_{1..B}$ merging the responses that come from the AMPs $116_{1..B}$.

Block 210 represents the output or result table being generated.

Exclusion-Join Operation

Figure 3:
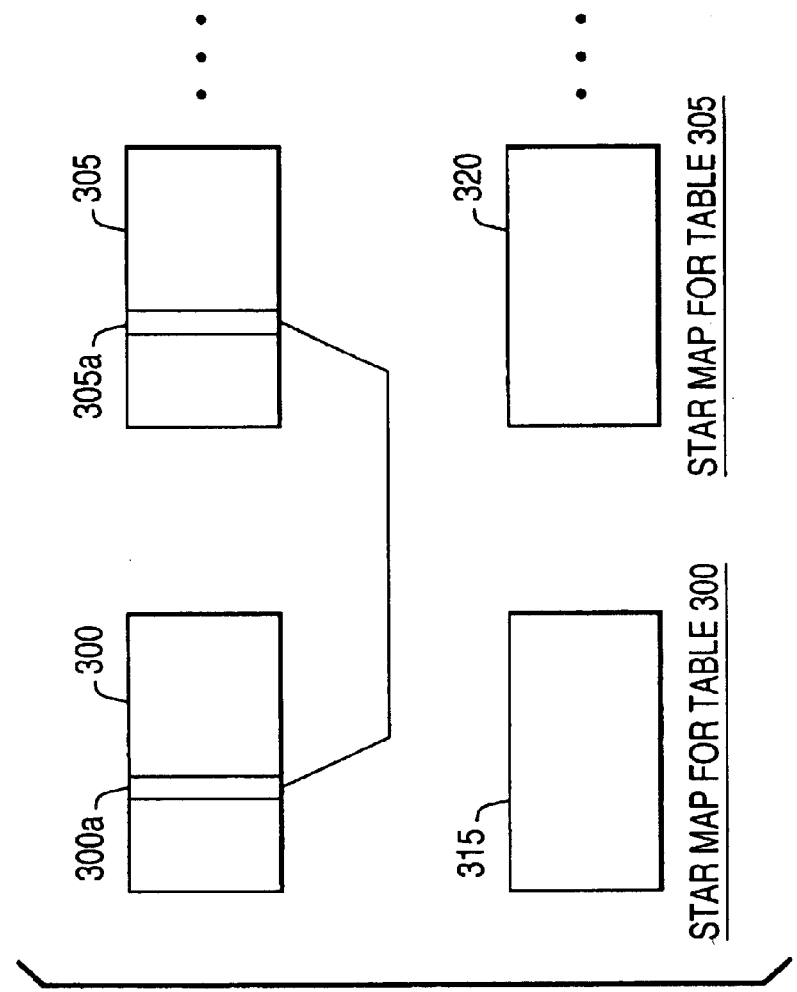
FIG. 3 is a representation of a two-table join and Star Maps associated with the two tables.

FIG. 3 is a query graph that represents an exclusion-join operation, wherein the boxes 300 and 305 represent tables, and the lines between principal index columns 300a and 305a of the tables 300 and 305, respectively, represent the join to be executed. It will be apparent to persons of ordinary skill that the principles described herein will apply to any exclusion-join involving two or more tables and to any join in which there are one or more join key columns as will be explained in more detail below.

An exemplary SQL query for performing the exclusion-join operation shown in FIG. 3 would be the following:
 SELECT <list of columns> FROM 300
  WHERE
   300.300a NOT IN (SELECT 305a FROM 305)
   <other selection criteria>

In this example, the tables 300 and 305 are joined according to equivalence relations indicated in the query. It is the job of the Optimizer subsystem of one of the PEs $114_{1..B}$ at step 202 of FIG. 2, to select a least costly join plan.

In a join such as that illustrated in FIG. 3, there may be numerous unnecessary accesses to the tables 300 and 305 when performing the join operations. Consider one example using FIG. 3. Assume that each of the tables 300 and 305 has approximately 1 billion rows, and the join operation produces only 100,000 result rows. In this example, a large percentage of the accesses to the tables 300 and 305 are unnecessary.

Star Maps 315, 320 associated with each table 300, 305, respectively, can be used to minimize unnecessary accesses to the tables 300, 305. The Star Maps 315, 320 are bitmap index structures used to filter accesses to the tables 300 and 305, i.e., to determine whether join operations between rows of the tables 300 and 305 would be productive.

Star Map Structure

Figure 4:
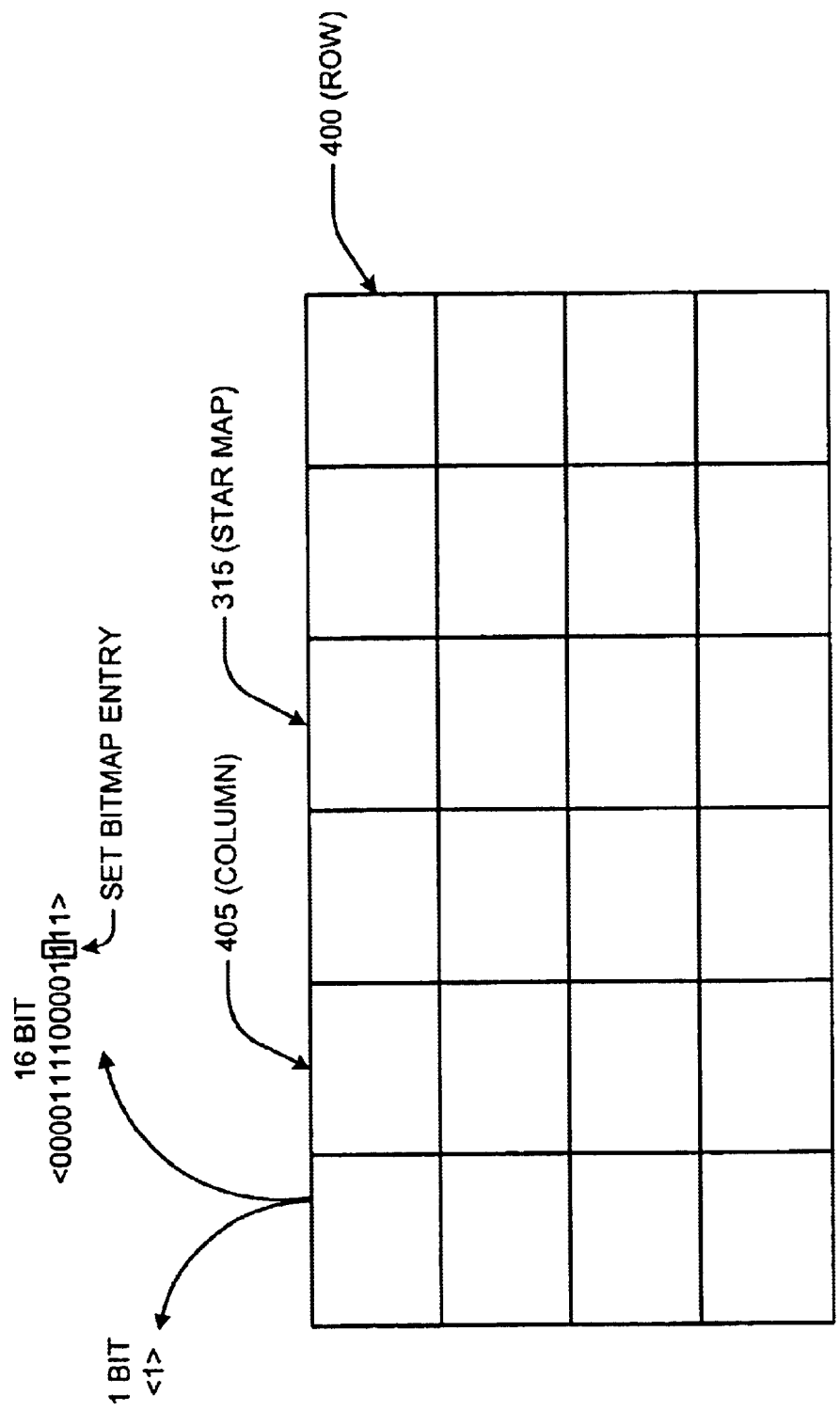
FIG. 4 is a block diagram that illustrates the structure of a Star Map according to the preferred embodiment of the present invention.

An example structure for a Star Map will now be discussed in relation to Star Map 315. It will be understood that this discussion will be equally applicable to the other Star Map 320 illustrated in FIG. 3. The example Star Map 315, which is associated with table 300, includes a plurality of rows 400, wherein each row includes a plurality of columns 405, as shown in FIG. 4. In one example, the Star Map 315 includes 64K rows 400, each of the rows 400 includes 64K columns 405, and each of the columns 405 comprises either a 1-bit or a 16-bit value. In one example, a bit in the 1-bit value having a value "1", rather than "0", is referred to as a "set bitmap entry." When the number of rows 400 of the Star Map 315 is 64K and each row 400 has 64K columns 405, then the Star Map 315 can map approximately 232 or 4 billion rows in its associated table 300 when the column 405 comprises a 1-bit value or 236 or 64 billion rows in its associated table 300 when the column 405 comprises a 16-bit value.

The number of rows 400, the number of columns 405, the size of each column 405 value, and the hashing functions used are determined and fixed at Star Map creation time, depending on the cardinality of the table being represented. Of course, those skilled in the art will recognize that any number of rows 400, any number of columns 405, any size of column 405 value, and any number of different hashing functions could be used without departing from the scope of the present invention. Further, those skilled in the art will recognize that the Star Map 315 may take a form different from the form illustrated in FIG. 4, such as an ordered sequence of bits, bytes, or words, without departing from the scope of the present invention.

One or more join columns of the table 300 associated with the Star Map 315 are used to generate the column 405 values of the Star Map 315, wherein the join columns usually comprise a partition index or a primary index. With some additional enhancements, a secondary index of the table can be used. Depending on the structure of the data base and its indexes any other suitable index can be used. The primary index of the table is used in the following examples. In the example shown in FIG. 3, the join key columns 300a and 305a are used to generate the respective Star Maps 315 and 320, respectively.

The join key columns 300a and 305a can include more than one column from their respective tables. In one example, the table's 300 join columns are concatenated (if there is more than one join column) and then hashed to generate a 32-bit hash-row value. This 32-bit hash-row value is then used to address the Star Map 315. In one example, the upper 16 bits of the 32-bit hash-row value are used to select a row 400 of the Star Map 315 and the lower 16 bits of the 32-bit hash-row value are used to select a column 405 of the selected row 400 of the Star Map 315. The column 405 value indicates whether the corresponding row may exist in the table 300 associated with the Star Map 315. If the selected column 405 value is set, then the corresponding row might exist in the table 300; otherwise, the row would not exist in the table 300.

A bitmap entry in a Star Map conveys two types of information. First, if the bitmap entry is set, a row that hashes to that location exists in the corresponding table but because a hashing algorithm may produce the same hash result for many different inputs, a set bitmap entry does a not definitively identify a row in the corresponding table. Just as importantly, if the bitmap entry is not set, the corresponding table does not have a row that hashes to that location. Thus, a Star Map not only gives clues about what a corresponding table contains, it also gives firm information concerning what it does not contain.

When the number of rows in the table 300 associated with the Star Map 315 is less than 4 billion, and when there is not significant skew in the join column values of its associated table, then each column 405 of the Star Map 315 may only comprise a 1-bit value to indicate whether the corresponding record exists in the table 300. However, when the number of rows in the table exceeds 4 billion, or when there is significant skew in the join columns of the table 300 associated with the Star Map, then additional bits may be added to each column 405 of the Star Map 315, so that a single column 405 can be used for multiple hash-row values of its associated table 300, in order to deal with hash collisions.

In one example, each column 405 within a row 400 of the Star Map 315 selected by the hash-row value of the table 300 associated with the Star Map 315 may comprise 16 bits. In that case, each hash-row value of the table 300 would select both a row 400 and a column 405 of the Star Map 315, and then another hash function would be performed on the join columns of the table 300 to select one of the bits within the selected column 405. If the selected bit is set, then the corresponding row might exist in the table 300; otherwise, the row would not exist in the table 300. Of course, there would still be the possibility of hash collisions, even with the larger columns 405 of the Star Map 315.

The Star Map 315 is updated whenever changes are made to its associated table 300. For example, when a row is inserted into the associated table 300, a corresponding column 405 value in a corresponding row 400 of the Star Map 315 is set. Similarly, when a row is deleted from the table 300, a corresponding column 405 value in a corresponding row 400 of the Star Map 315 is reset, taking hash collisions into account. When a row is updated in the associated table 300, a column 405 value in a row 400 of the Star Map 315 corresponding to the new hash-row value and new column values are set, while a column 405 value in a row 400 of the Star Map 315 corresponding to the old hash-row value and column values are reset, while taking hash collisions into account.

The number of bits stored in each of the 64K columns 405 of the Star Map 315 is called the "degree" of the Star Map 315 and determines the size of each row 400 in the Star Map 315. For example, a Star Map 315 of degree 1 has a row 400 length of 8 K bytes, while a Star Map 315 of degree 16 has a row 400 length of 128 K bytes. Generally, the degree of the Star Map 315 may be implemented as a parameter, so that the row size can be set to any desired value.

In the examples described above, the total size of the Star Map 315 is either 512 MB (a Star Map 315 of degree 1) or 8192 MB (a Star Map 315 of degree 16), respectively. The Star Map 315 may be partitioned across PUs 102 (for example, in a manner similar to the table) according to the upper 16 bits of the 32-bit hash-row value. Therefore, in a 20-node system 100, each PU 102 would store approximately 25 MB (a Star Map 315 of degree 1) or 410 MB (a Star Map 315 of degree 16) of a partitioned Star Map 315, respectively. Similarly, in a 96-node system, each PU 102 would manage approximately 5 MB (a Star Map 315 of degree 1) or 85 MB (a Star Map 315 of degree 16) of a partitioned Star Map 315, respectively. Partitions of these sizes may fit entirely within the main memory of the PUs 102.

Logic of the Join Algorithm

Star Maps can make the execution of joins involving a set of tables T1 through TN more efficient. Assume that each of the tables T1 through TN has an associated Star Map, S1 through SN, respectively. To perform a join, the system first performs one or more Boolean operations (such as a logical AND, OR, XOR, NAND, etc., or a combination of such operations) using the bitmap entries of two or more Star Maps to produce one or more intermediate Star Maps SINT, with the number of intermediate Star Maps depending on the complexity of the query, and in a final operation a final join Star Map SJ.

The system then uses SJ to select rows from the tables T1 through TN. For example, the system may use set bitmap entries in SJ as keys to select rows from T1 through TN. In one example, the hash value of the row or rows to be selected can be derived by concatenating the 16 bit Star Map row position and the 16 bit Star Map column position of a set bitmap entry to create a 32 bit hash value. Tables T1 through TN can then be searched for rows that produce that hash value. Depending on the hash algorithm, the search can result in the retrieval of more than one row from a given table or tables. However, reconstruction of a hash value in any kind of Star Map environment can be performed very easily. Alternatively, the system may use unset bitmap entries in SJ as keys.

The system joins the resulting rows to produce a join result. Under certain circumstances, determined by the query, the Boolean operation being performed, and other factors including the size of SJ and the size of the tables T1 through TN, such a system will access fewer rows in T1 through TN to perform the join, thereby reducing the cost of the query.

The use of Star Map to perform an exclusion join between two tables, T1 and T2 having Star Maps S1 and S2, respectively, can be accomplished by deriving a join Star Map SJ using the following expression:

$$SJ = S1 \text{ AND NOT } (S2) \tag{1}$$

Through the use of DeMorgan's Law and other properties of Boolean arithmetic and algebra, this expression can be rephrased in a variety of ways, including:

$$SJ = (S1 \text{ AND } S2) \text{ XOR } S1 \tag{2}$$

$$SJ = (S1 \text{ OR } S2) \text{ XOR } S2 \tag{3}$$

Further, these same mathematical properties can be used to derive many other mathematical expressions to accomplish the same function.

In the processing of most of the expressions shown above, an intermediate Star Map, SINT, will be generated. For example, in expression (1), SINT is the inverse of S2. In expression (2) and (3), (S1 AND S2) and (S1 OR S2), respectively, correspond to SINT. It is not always necessary to have an SINT. For example, expression (1) could be evaluated using an S2BAR Star Map, which is the inverse of S2, generated directly from T2, without the necessity of deriving S2.

Figure 5:
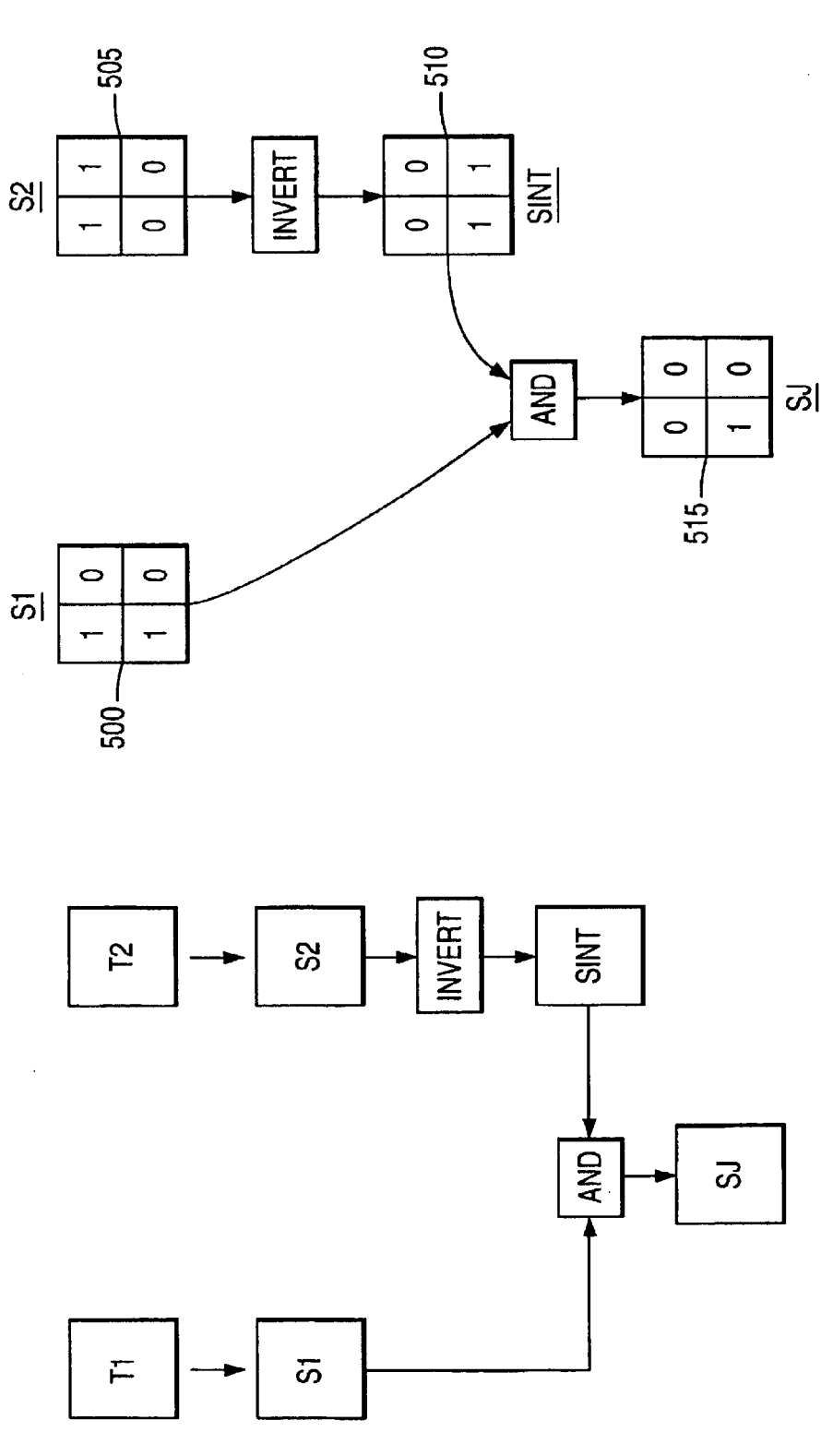
FIG. 5 is a block diagram of a method for performing a exclusion join operation with two tables using Star Maps.

One example way of evaluating expression (1), illustrated in FIG. 5, assumes that tables T1 and T2 have corresponding Star Maps S1 and S2, respectively. The process begins by inverting S2 to form SINT. S1 and SINT are then logically ANDed to form SJ.

The right side of FIG. 5 illustrates this processing using two very simple 2 by 2 Star Maps, 500, and 505. The intermediate Star Map SINT 510 is created by inverting S2 505. S1 500 and SINT 510 are logically ANDed to create the join Star Map SJ 515. It is assumed that the Star Maps have the same size and are created using the same hashing algorithm. In that case, ANDing the two Star Maps together requires applying a logical AND function to corresponding entries from the two Star Maps. An entry in the join Star Map is set only if the corresponding entries in S1 and SINT are set. The join Star Map 515 shows only a set single bit set because the corresponding row and column is the only location set to "I" in both source Star Maps 500 and 515.

Figure 6:
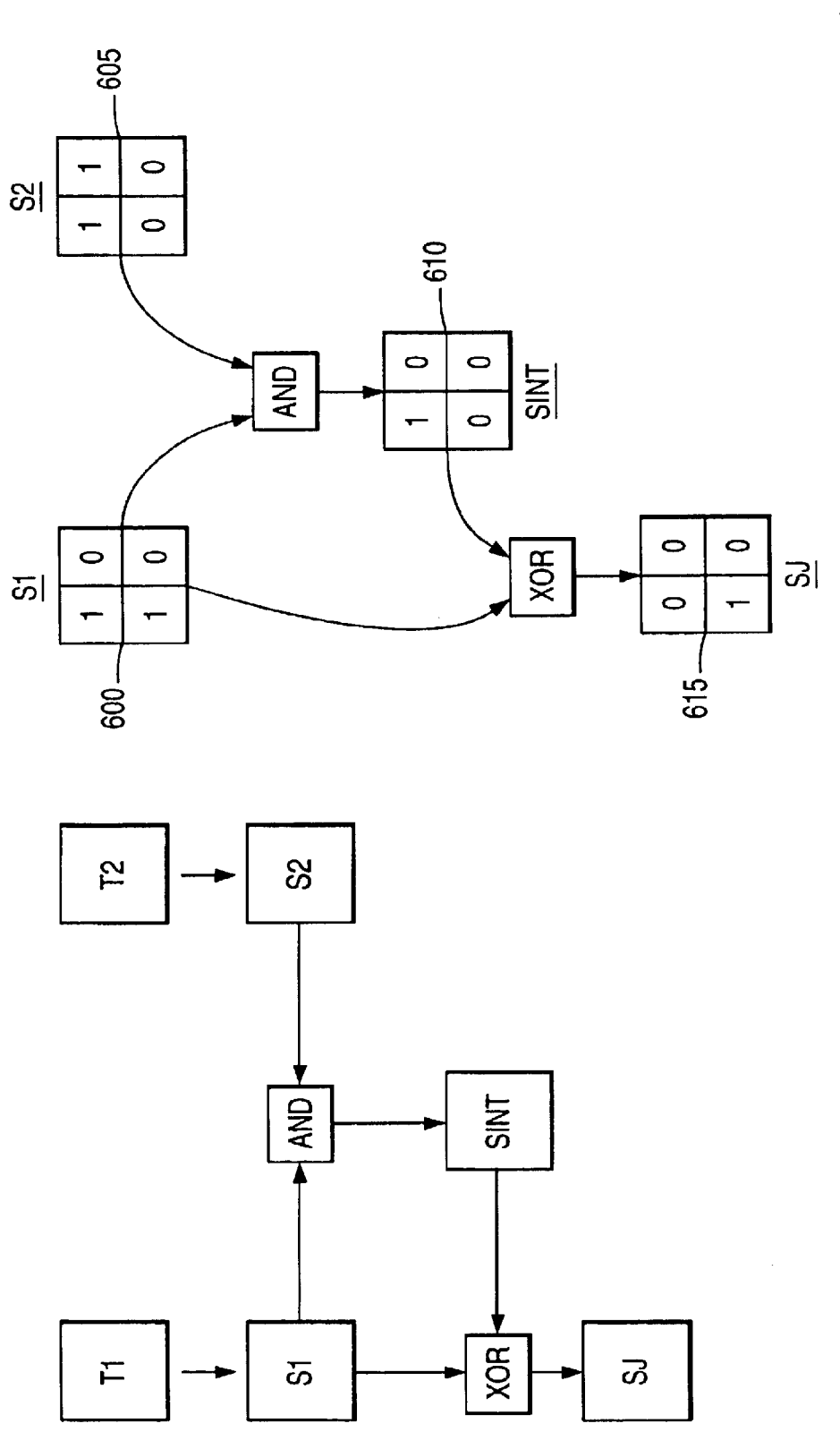
FIG. 6 is a block diagram of another method for performing a exclusion join operation with two tables using Star Maps.

FIG. 6 shows another example method of performing an exclusion join, applying the principles of the above equation (2). In this example, S1 and S2 are logically ANDed to create an intermediate Star Map 610. A logical Exclusive OR function is then applied to the intermediate Star Map 610 and the Star Map 600 associated with T1. The resulting join Star Map 615 shows as set only entries which are set in the Star Map 600 associated with T1 and not set in the Star Map 605 associated with T2.

Figure 7:
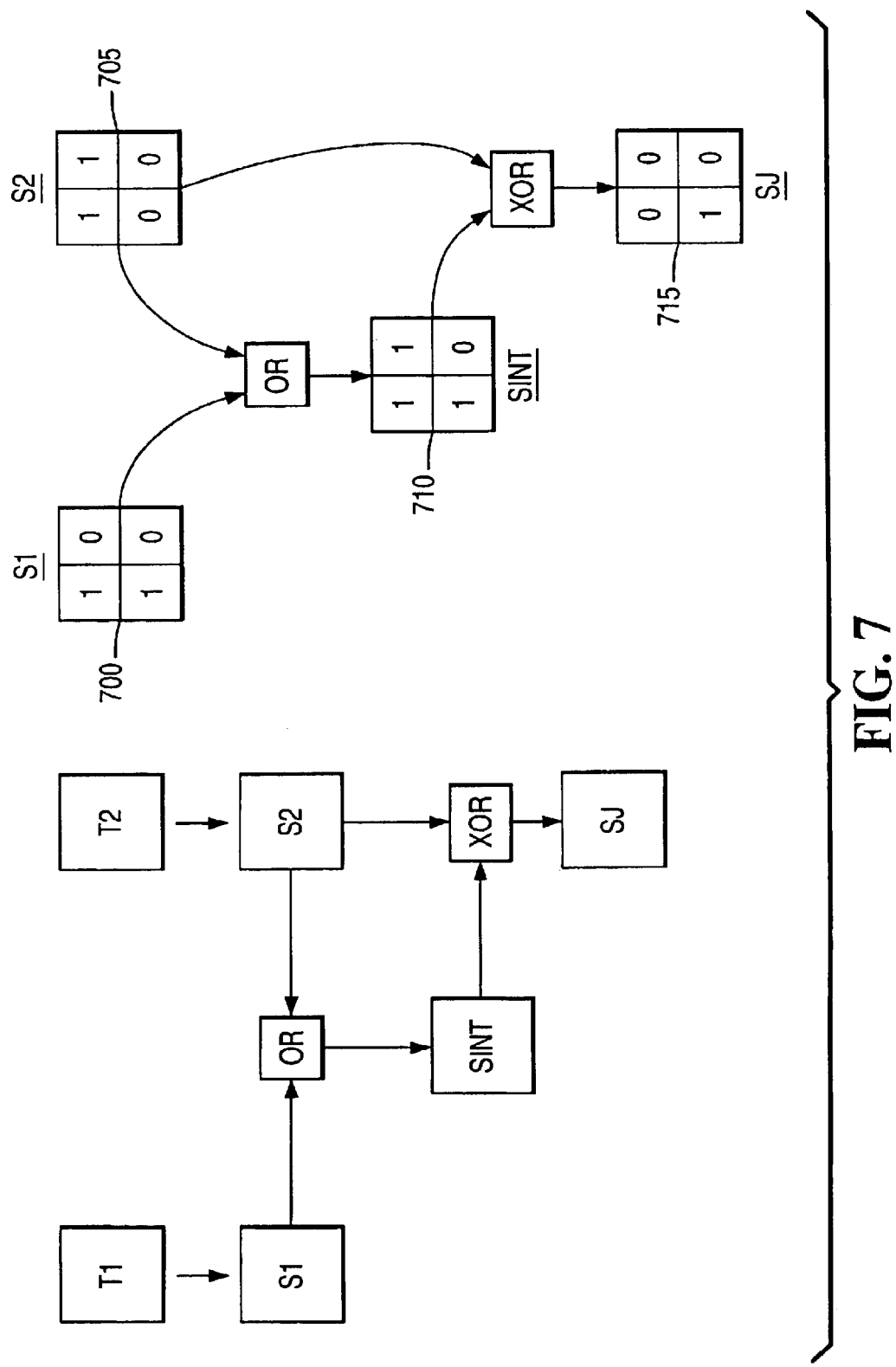
FIG. 7 is a flow chart of yet another method for performing a exclusion join operation with two tables using Star Maps.

As stated above, Boolean logic allows a variety of possible functions to be performed on the initial two Star Maps to generate the same result. FIG. 7 shows yet another example of how to achieve the same result as shown in FIG. 5 or FIG. 6. Instead of an AND operation, in this implementation, the two Star Maps 700 and 705 are logically ORed to generate the intermediate Star Map SINT 710. An Exclusive OR function is then performed on the Star Map S2 705 associated with T2 and the intermediate Star Map SINT 710 to generate the join Star Map SJ. Again, the right side of FIG. 7 shows an example of simplified 2 by 2 Star Maps 700 and 705 being processed to produce an intermediate Star Map 710 and a final Star Map 715.

Other implementations are possible, as can be seen by a person skilled in the art. Which implementation to use to perform the exclusion join Star Map might depend on the capabilities of the respective computer system, in particular, the respective central processing unit. However, in most systems two operation have to be performed on the initial Star Maps and the intermediate Star Map unless a respective central processing unit can perform two operations on an operand in a single cycle. Such a functionality may not be present in computer systems for data bases.

A person of ordinary skill will recognize that it is not necessary for S1 and S2 to be the same size, be created using the same hash function or have the same mapping of hash values. If any of those parameters or any other parameter or parameters of S1 and S2 are different, the system will make the necessary adjustments between the two Star Maps prior to performing the Boolean function or functions or as the Boolean function or functions are being performed assuming that two Star Maps are sufficiently similar to allow such adjustments to be made. Persons of ordinary skill will also recognize that the logical functions described above can be accomplished using other equivalent Boolean expressions, such as, for example, expressions equivalent to the specified logical function by virtue of DeMorgan's Law.

The exclusion join algorithm can also be applied to a plurality of tables. For example, a query might ask for rows in table group T1' consisting of tables Ta1..Ta5 where there are no matching rows in table group T2' consisting of tables Ta6 . . . Ta10. In this example, Star Maps S1' consisting of Star Maps Sa1 . . . Sa5 associated with tables Ta1 . . . Ta5 are logically ORed, thus generating Star Map S1. Star Maps S2' consisting of Star Maps Sa6 . . . Sa10 associated with tables Ta6 . . . Ta10 are logically ORed, thus generating Star Map S2. The resulting two Star Maps S1 and S2 are then processed as described above.

The final resulting exclusion join Star Map SJ contains bitmap entries, which, when set, indicate that T1 contains rows that hash to the location of the set bitmap entry in the Star Map SJ and that T2 does not contain such a row. Consequently, the rows in T1 that hash to that location contribute to the join result. In contrast, if a bitmap entry in the Star Map SJ is not set then (1) T1 does not contain any rows that hash to the location of that bitmap entry in the Star Map SJ; (2) T2 does contain such a row; or (3) both conditions (1) and (2) are true. Consequently, T1 rows that map to locations of unset bitmap entries in SJ may not contribute to the join result. To make a final determination, T2 is searched for a row that not only maps to the location of the unset bitmap entry but also has a value in its join key column or columns that matches the value in the join key column or columns of the selected row from T1. If no such row is found in T2, then the selected T1 row contributes to the join result.

Figure 8:
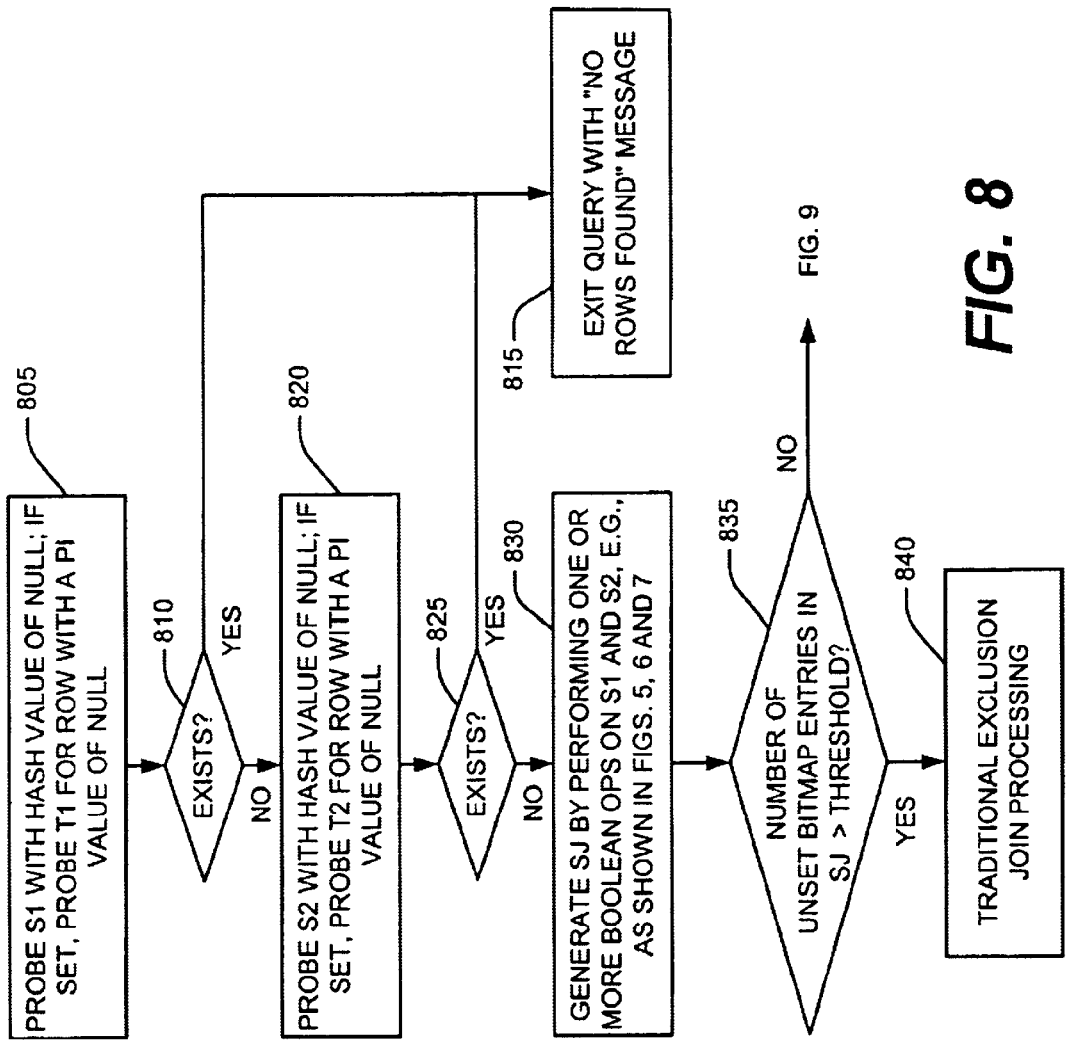
FIGS. 8 and 9 are flow charts of the exclusion join process.

Processing of the exclusion join using a join Star Map prepared using one of expressions (1), (2) or (3), or equivalents, and the processing illustrated in FIGS. 5, 6 and 7, or equivalents, begins by probing S1 with the hash value of NULL (block 805), as shown in FIG. 8. If the corresponding bitmap entry is set, then T1 is probed for a row with a PI value of NULL, where PI can indicate a primary index, a partition index, or some other index. If such a row exists (block 810), the query exits with a "no rows found" message (block 815).

Otherwise, the same process is then performed on S2 and T2. S2 is probed with the hash value of NULL (block 820). If the corresponding bitmap entry is set, then T2 is probed for a row with a PI value of NULL. If such a row exists (block 825), the query exits with a "no row found" message (block 815).

Otherwise, the join Star Map SJ is generated by performing one or more Boolean operations on S1 and S2, using, expressions (1), (2), or (3), or equivalents, and the processing shown in FIG. 5, 6 or 7, or equivalents (block 830). There are situations in which it is more efficient to use traditional join processing to accomplish the exclusion join than it would be to use SJ. For example, if both T1 and T2 are large tables and the number of unset bitmap entries in SJ is large, it is likely that the savings provided by using SJ will be offset by the number of accesses necessary to T2. To avoid such inefficiencies, if the number of unset bitmap entries in SJ is greater than a threshold (block 835), traditional exclusion join processing is executed (block 840). In one example, the threshold is set to the number of blocks necessary to store the rows of T2. In another example, the threshold is set to a percentage, seventy-five percent, for example, of the number of blocks necessary to store T1. In still another example, the threshold is related to the number of rows and number of blocks in T2. It will be recognized by persons of ordinary skill that the threshold could be set to other values without departing from the scope of the claims herein. Further, the expected cardinality of the join may be tested against a cardinality threshold to determine whether to perform traditional join processing. If the expected join cardinality is greater than a cardinality threshold, traditional join processing would be performed.

Figure 9:
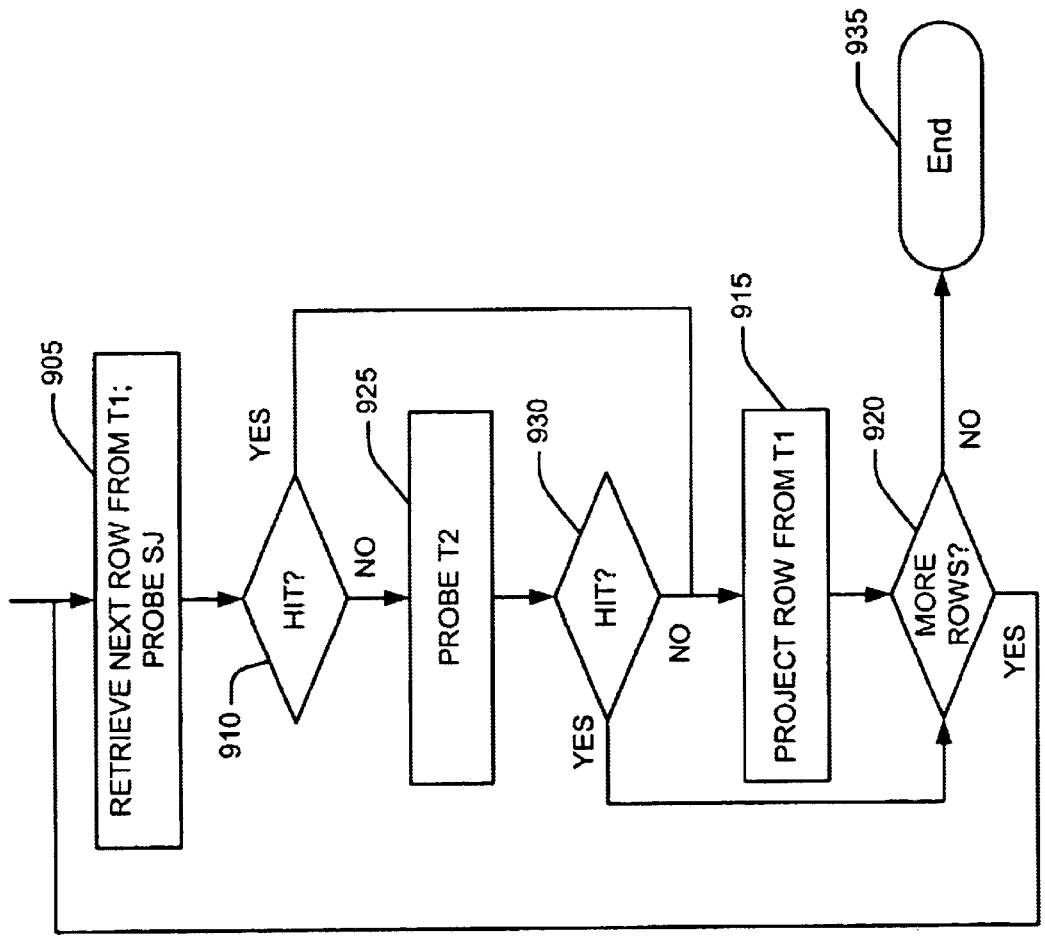

Otherwise, if the number of unset bitmap entries is less than the threshold, S1 is used to perform the exclusion join, as illustrated in FIG. 9.

The system will enter into a loop in which it retrieves the next row from T1, which will be the first row, if any, the first time through the loop, and uses the value of the join key column or columns from the retrieved row to probe SJ (block 905). In one example, the values of the join key column or columns are hashed to produce a hash result that can be parsed to index into SJ as described above. If the probe into SJ produces a hit, that is if the corresponding bitmap entry in SJ is set (block 910), then the selected T1 row satisfies the query, because no row in T2 has values in its join key column or columns that match the value in the join key column or columns of the selected T1 row, and the system will project the selected T1 row as a query result (block 915). Subsequently, if there are more rows in T1 (block 920), the system will return to the beginning of the loop (block 905), retrieve the next row from T1, and continue processing.

If, on the other hand, the probe into SJ does not produce a hit (block 910) it is still necessary to probe T2 to determine whether the row in T2 that caused the probed bitmap entry in S2 not to be set disqualifies the row from T1. The system will probe T2 searching for hits, that is, T2 rows in which the value of the join key column or columns map (e.g. hash) to the location of the unset bitmap entry in SJ, and in which the value of the join key column or columns from the selected T1 row match the value of the join key column or columns from T2 (block 925). If there is a hit (block 930), that is if any row from T2 matches the selected T1 row in the join key column or columns, the selected T1 row will not be projected because it does not satisfy the exclusion join condition. The system will determine if there are any more qualifying rows in T1 (block 920) and if there are, it will return to the beginning of the loop. Otherwise, the processing will end (block 935).

If the probe into T2 (block 925) does not produce a hit (block 930), the exclusion join condition has been satisfied and the system will report the selected T1 row as a query result (block 915). The system will then determine if any further rows from T1 remain to be processed (block 920). If there are more rows to process, the system will return to the beginning of the loop. Otherwise, the processing ends (block 935).

It will be understood by persons of ordinary skill in the art that the threshold against which the number of entries in the join Star Map is tested can be adjusted from one exclusion join to the next or during the exclusion join process. The adjustment may be done manually or it may be done automatically based on a dynamic algorithm that analyzes the relationship between cost of exclusion joins and the threshold.

The preceding algorithm could be applied if the outer table in the join, T1 in the example, is a spool or a base table without a Star Map. The outer table could be redistributed on the join column or columns or it could be duplicated. The inner table, T2 in the example, would have a Star Map S2 on the partition column and the join column and the partition columns should be the same. In that case, rows from T1 would be read and used to probe S2 rather than SJ. Otherwise, the processing would be similar.

CONCLUSION

This concludes the description of the preferred embodiment of the invention. The following describes some alternative embodiments for accomplishing the same invention. In one alternative embodiment, any type of computer, such as a mainframe, minicomputer, or personal computer, could be used to implement the present invention. In addition, any DBMS that performs exclusion joins could benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for performing an exclusion join of at least a first table T1 and a second table T2, where each of the tables has an associated Star Map, S1 and S2, respectively, and each Star Map includes bitmap entries having locations indexed by a hash of one or more values associated with one or more join key columns of its associated table, where a bitmap entry in a Star Map, if set, indicates the presence of one or more rows in its associated table that has entries in the one or more join key columns that together hash to the location of the bitmap entry, the method including:

a) performing one or more Boolean operations using the bitmap entries of the Star Maps S1 and S2 to produce bitmap entries in a Star Map SJ where there is a corresponding set bitmap entry in S1 and no corresponding set bitmap entry in S2;

b) using SJ to identify qualifying rows from the first table T1; and c) providing the qualifying rows as an exclusion join result.

2. The method of claim 1, wherein using SJ to identify qualifying rows from the first table T1 includes performing the following until all rows from T1 have been selected:

b1) selecting a row in T1;

b2) hashing the combined entries in the one or more join key columns of the selected row to identify a bitmap entry in SJ; and b3) if the identified bitmap entry in SJ is set, identifying the selected row as a qualifying row.

3. The method of claim 2, wherein the exclusion join includes join conditions and using SJ to identify qualifying rows from the first table T1 further includes:

b4) if the identified bitmap entry in SJ is not set, attempting to find a row in T2 that has entries in its one or more join key columns that together hash to the location of the identified unset bitmap entry in SJ; and b5) if no such row can be found or if no found row from T2 satisfies the join conditions, identifying the selected row from T1 as a qualifying row.

4. The method of claim 1, further comprising only performing b and c if the number of unset bitmap entries in SJ is less than a threshold.

5. The method of claim 4, wherein the threshold is related to the number of rows in T2 and a number of blocks used to store T2.

6. The method of claim 1, further comprising determining an expected join cardinality; and only performing a, b and c if the expected join cardinality is less than a cardinality threshold.

7. The method of claim 1, wherein one of the one or more Boolean operations produces an intermediate Star Map SENT.

8. The method of claim 7, wherein the intermediate Star Map SINT results from ANDing Star Maps S1 and S2 and Star Map S3 results from exclusive ORing Star Map SINT and S1.

9. The method of claim 7, wherein the intermediate Star Map SINT results from ORing Star Maps S1 and S2 and Star Map S1 results from exclusive ORing Star Map SINT and S2.

10. The method of claim 7, wherein the intermediate Star Map SINT results from inverting Star Map S2 and Star Map SJ results from ANDing Star Maps SINT and S1.

11. The method of claim 1, wherein a plurality of tables T1' and tables T2' and a plurality of associated Star Maps S1' and Star Maps S2' are provided, whereby Star Maps S1' are logically ORed to generate Star Map S1 and Star Maps S2' are logically ORed to generate Star Map S2.

12. A computer program, stored on a tangible storage medium, for performing an exclusion join of at least a first table T1 and a second table T2, where each of the tables has an associated Star Map, S1 and S2, respectively, and each Star Map includes bitmap entries having locations indexed by a hash of one or more of values associated with one or more join key columns of its associated table, where a bitmap entry in a Star Map, if set, indicates the presence of one or more rows in its associated table that has entries in the one or more join key columns that together hash to the location of the bitmap entry, the program including executable instructions that cause a computer to:
    a) perform one or more Boolean operations using the bitmap entries of the Star Maps S1 and S2 to produce bitmap entries in a Star Map SJ where there is a corresponding set bitmap entry in S1 and no corresponding set bitmap entry in S2;
    b) use SJ to identify qualifying rows from the first table T1; and
    c) provide the qualifying rows as an exclusion join result.

13. The computer program of claim 12, wherein the executable instructions for causing a computer to use SJ to identify qualifying rows from the first table T1 cause the computer to perform the following until all of the rows of T1 have been selected:
    b1) select a row in T1;
    b2) hash the combined entries in the one or more join key columns of the selected row to identify a bitmap entry in SJ; and
    b3) if the identified bitmap entry in SJ is set, identify the found row as a qualifying row.

14. The computer program of claim 13, wherein the exclusion join includes join conditions, and the executable instructions for causing a computer to use SJ to identify qualifying rows from the first table T1 cause the computer to:
    b4) if the identified bitmap entry in SJ is not set, attempt to find a row in T2 that has entries in its one or more join key columns that together hash to the location of the identified unset bitmap entry in SJ; and
    b5) if no such row can be found or if no found row from T2 satisfies the join conditions, identify the selected row from T1 as a qualifying row.

15. The computer program of claim 12, where the computer:
    only performs b and c if the number of unset bitmap entries in SJ is less than a threshold.

16. The computer program of claim 15, where the threshold is related to the number of rows in T2 and a number of blocks used to store T2 rows.

17. The computer program of claim 12, where the computer further
    determines an expected join cardinality; and
    only performs a, b and c if the expected join cardinality is less than a cardinality threshold.

18. The computer program of claim 12, wherein an intermediate Star Map SINT is generated.

19. The computer program of claim 18, wherein the intermediate Star Map SINT results from ANDing Star Maps S1 and S2 and Star Map SJ results from exclusive ORing Star Map SINT and S1.

20. The computer program of claim 18, wherein the intermediate Star Map SINT results from ORing Star Maps S1 and S2 and Star Map SJ results from exclusive ORing Star Map SINT and S2.

21. The computer program of claim 18, wherein the intermediate Star Map SINT results from inverting Star Map S2 and Star Map SJ results from ANDing Star Maps SINT and S1.

22. The computer program of claim 12, wherein a plurality of tables T1' and tables T2' and a plurality of associated Star Maps S1' and Star Maps S2' are provided, whereby Star Maps S1' are logically ORed to generate Star Map S1 and Star Maps S2' are logically ORed to generate Star Map S2.

23. A database system for accessing a database, the database system including
    a massively parallel processing system including
        one or more nodes;
        a plurality of CPUs, each of the one or more nodes providing access to one or more CPUs;
        a plurality of virtual processes each of the one or more CPUs providing access to one or more processes;
        each process configured to manage data stored in one of a plurality of data-storage facilities;
    at least a first table T1 and a second table T2, being distributed among the data-storage facilities;
    each of the tables having an associated Star Map, S1 and S2, respectively, each Star Map being distributed among the data-storage facilities,
    each Star Map including bitmap entries having locations indexed by a hash of one or more of values associated with one or more join key columns of its associated table, where a bitmap entry in a Star Map, if set, indicates the presence of one or more rows in its associated table that has entries in the one or more join key columns that together hash to the location of the bitmap entry;
    a join process executed on one or more of the plurality of CPUs that cause the CPUs to
        a) perform one or more Boolean operations using the bitmap entries of the Star Maps S1 and S2 to produce bitmap entries in a Star Map SJ where there is a corresponding set bitmap entry in S1 and no corresponding set bitmap entry in S2;
        b) use SJ to identify qualifying rows from the first table T1; and
        c) provide the qualifying rows as an exclusion join result.

24. The database system of claim 23, wherein when using SJ to identify qualifying rows from the first table T1 the computer repeats the following until all rows from T1 have been selected:
    b1) selects a row in T1;
    b2) hashes the combined entries in the one or more join key columns of the selected row to identify a bitmap entry in SJ; and
    b3) if the identified bitmap entry in SJ is set, identifies the selected row as a qualifying row.

25. The database system of claim 24, wherein the exclusion join includes join conditions, and when using SJ to identify qualifying rows from the first table T1 the computer further performs the following:
    b4) if the identified bitmap entry in SJ is not set, attempts to find a row in T2 that has entries in its one or more join key columns that together hash to the location of the identified unset bitmap entry in SJ; and
    b5) if no such row can be found or if no found row from T2 satisfies the join conditions, identifies the selected row from T1 as a qualifying row.

26. The database system of claim 23, where the computer further:
    only performs b and c if the number of unset bitmap entries in SJ is less than a threshold.

27. The database system of claim 26, wherein the threshold is related to the number of rows in T2 and a number of blocks used to store T2 rows.

28. The database system of claim 23, where the computer further
    determines an expected join cardinality; and
    only performs a, b and c if the expected join cardinality is less than a cardinality threshold.

29. The database system of claim 23, in which, when performing the one or more Boolean operations, the CPUs generate an intermediate Star Map SINT.

30. The database system of claim 29, wherein the intermediate Star Map SINT results from ANDing Star Map S1 and S2 and Star Map SJ results from exclusive ORing Star Map SINT and S1.

31. The database system of claim 29, wherein the intermediate Star Map SINT results from ORing Star Map S1 and S2 and Star Map SJ results from exclusive ORing Star Map SINT and S2.

32. The database system of claim 29, wherein the intermediate Star Map SINT results from inverting Star Map S2 and Star Map SJ results from ANDing Star Map SINT and S1.

33. The database system of claim 23, wherein a plurality of tables T1' and tables T2' and a plurality of associated Star Maps S1' and Star Maps S2' are provided, whereby Star Maps S1' are logically ANDed to generate Star Map S1 and Star Maps S2' are logically ORed to generate Star Map S2.

34. The database system of claim 33 where each of tables T1' and T2' are indexed by the hash of the combined entries in its respective one or more join key columns, and when using SJ to identify qualifying rows from the tables T1' the computer uses the hash value associated with the location of an unset bitmap entry in SJ as an index to retrieve rows from tables T2'.

35. The database system of claim 23 where one or more of the Star Maps is a table and a first portion of the hash value that indexes the locations of a Star Map defines a row within the Star Map and a second portion of the hash value defines an offset within the defined row.

36. The database system of claim 23 where the first portion is the first half of the hash value and the second portion is the second half of the hash value.

37. The database system of claim 23 where the hash value is 32 bits long, the first portion is the first 16 bits of the hash value, and the second portion is the second 16 bits of the hash value.

38. The database system of claim 23 where each entry in a Star Map is one bit.

39. The database system of claim 23 where each entry in a Star Map is sixteen bits.

40. The database system of claim 23 where each Star Map entry includes one or more bits and each bit corresponds to the hash of one or more values associated with the one or more join key columns of its associated table.

41. A method for performing an exclusion join of at least a first table T1 and a second table T2, where table T2 has an associated Star Map S2 which includes bitmap entries having locations indexed by Ha hash of one or more values associated with one or more join key columns of T2, where a bitmap entry in S2, if set, indicates the presence of one or more rows in T2 that has entries in the one or more join key columns that together hash to the location of the bitmap entry, the method including:
    a) selecting a row in T1;
    b) hashing the combined entries in the one or more join key columns of the selected row to identify a bitmap entry in S2;
    c) if the identified bitmap entry in S2 is not set, identifying the selected row as a qualifying row;
    d) if the identified bitmap entry in S2 is set, finding one or more rows in T2 that have entries in its one or more join key columns that together hash to the location of the identified set bitmap entry in S2;
    e) if none of the one or more found rows from T2 satisfy the join conditions, identifying the selected row from T1 as a qualifying row;
    f) repeating a)–e) until all of the rows in T1 have been selected; and
    g) providing the qualifying rows as an exclusion join result.

42. A method for performing a join of at least a first table T1 and a second table T2, where each of the tables has an associated Star Map, S1 and S2, respectively, and each Star Map includes bitmap entries having locations indexed by a hash of one or more values associated with one or more join key columns of its associated table, where a bitmap entry in a Star Map, if set, indicates the presence of one or more rows in its associated table that has entries in the one or more join key columns that together hash to the location of the bitmap entry, the method including:
    a) if the bitmap entry corresponding to the location in S1 identified by the hash of a NULL is set, probe T1 for a row having NULLs in its one or more join key columns, and if such a row is found, exiting the query with a "no rows found" message;
    b) otherwise if the bitmap entry corresponding to the location in S2 identified by the hash of a NULL is set, probe T2 for a row having NULLs in its one or more join key columns, and if such a row is found, exiting the query with a "no rows found" message; and
    c) otherwise perform the join operation.

* * * * *

UNITED STATES PATENT AND TRADEMARK OFFICE
CERTIFICATE OF CORRECTION

PATENT NO. : 6,957,210 B1
DATED : October 18, 2005
INVENTOR(S) : Ramesh, B.

It is certified that error appears in the above-identified patent and that said Letters Patent is hereby corrected as shown below:

Column 14,
Line 52, after "map" first occurrence, delete "S1" and insert -- SJ --.
Line 48, after "map" first occurrence, delete "S3" and insert -- SJ --.
Line 45, delete "sent" and insert -- sint --.

Column 18,
Line 6, after "indexed by", delete "H".

Signed and Sealed this

Fourteenth Day of March, 2006

JON W. DUDAS
*Director of the United States Patent and Trademark Office*